Jan. 4, 1955  D. L. BEASLEY  2,698,704
GRAIN DRILL SEED CASE
Filed Aug. 30, 1951  3 Sheets-Sheet 1
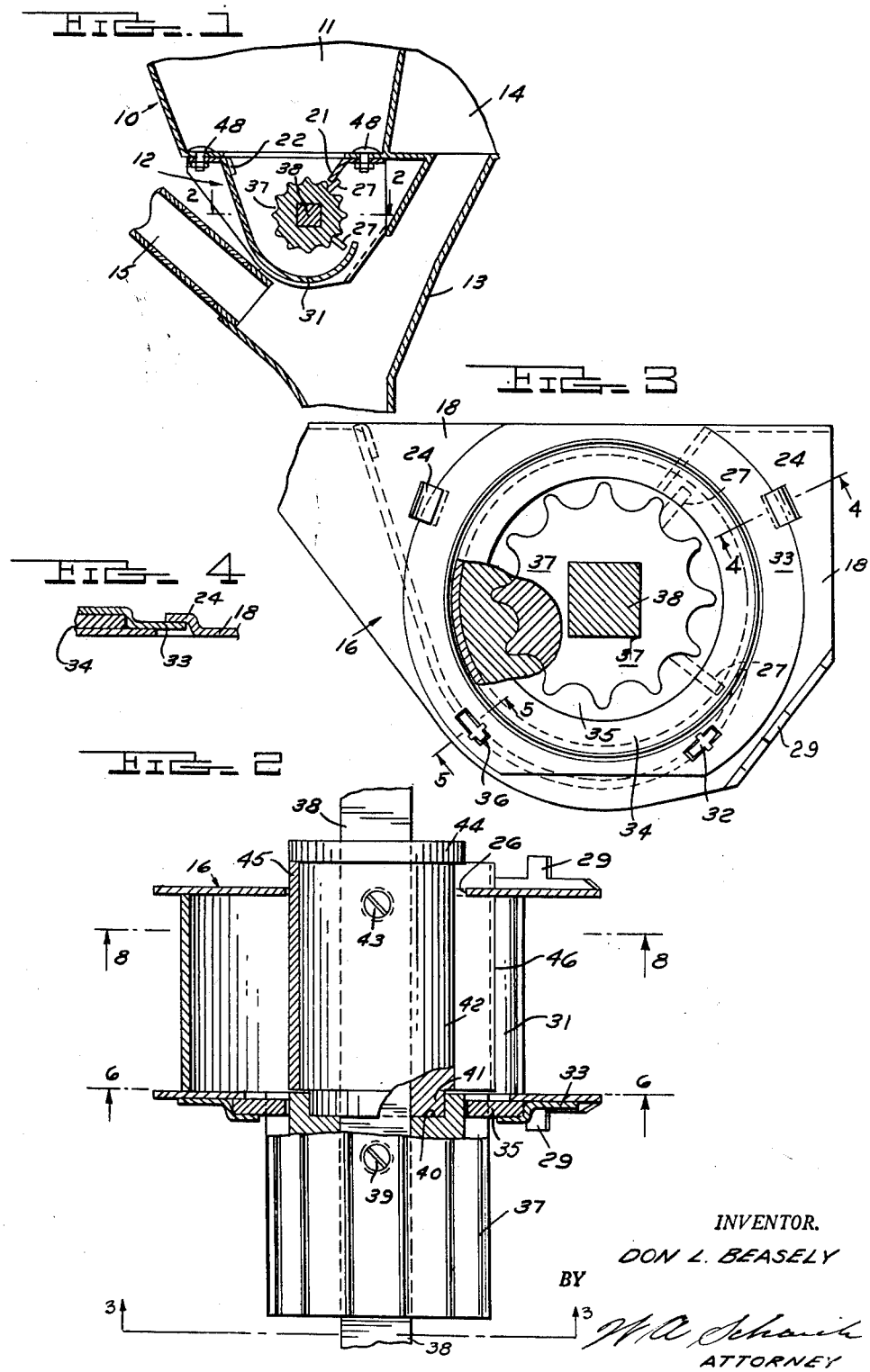
INVENTOR.
DON L. BEASLEY
BY
ATTORNEY

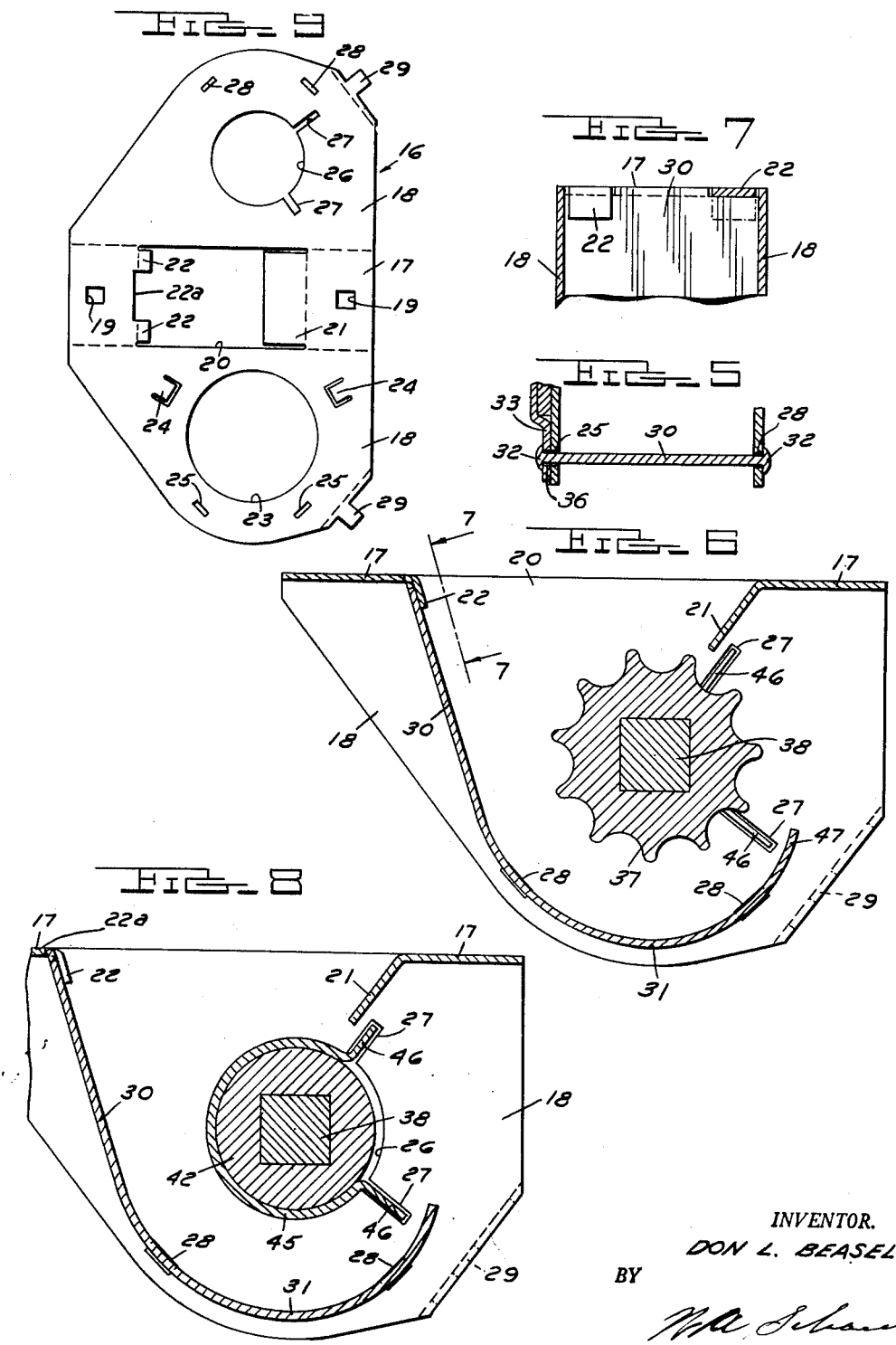

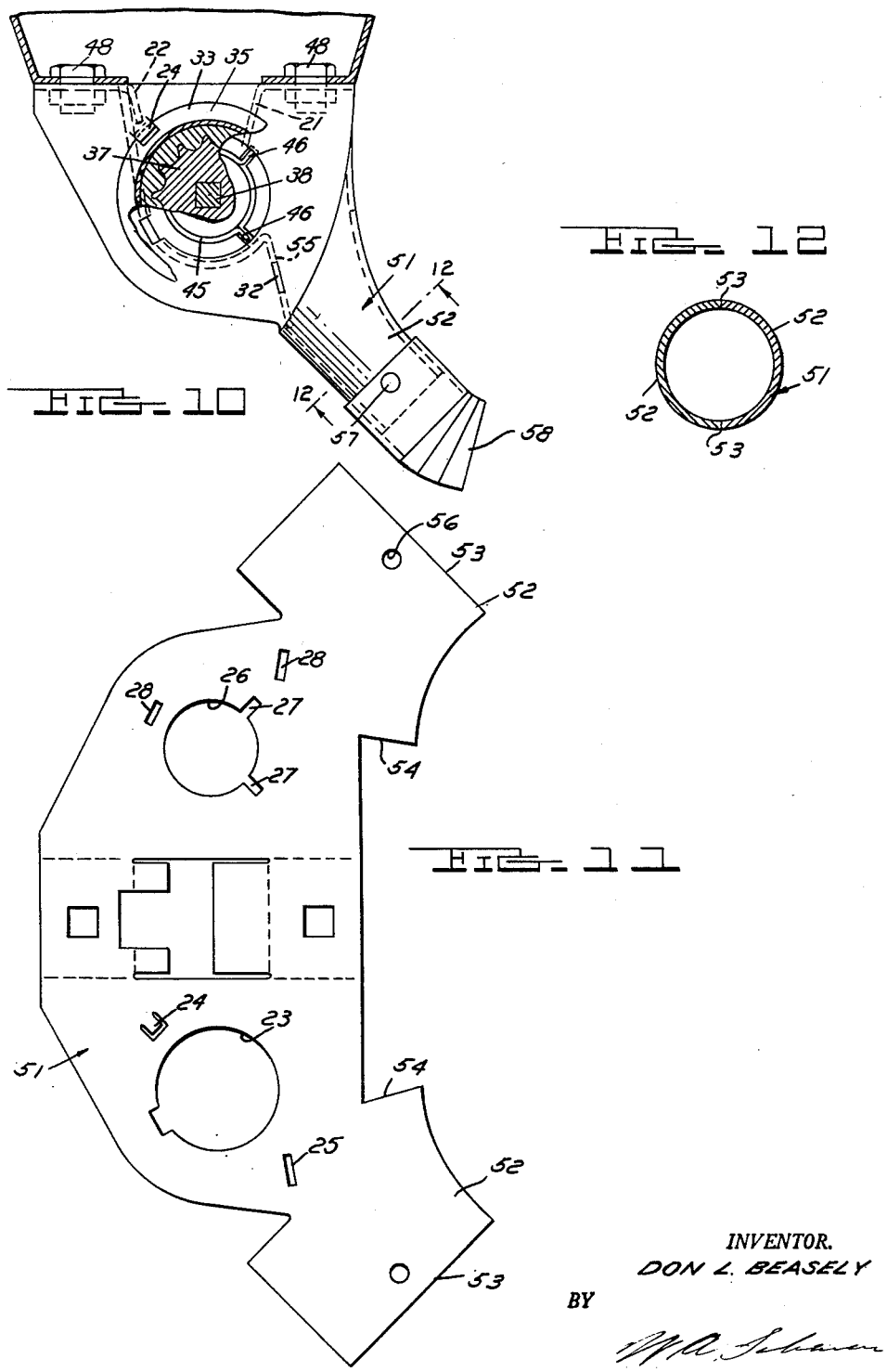

United States Patent Office 2,698,704
Patented Jan. 4, 1955

2,698,704

GRAIN DRILL SEED CASE

Don L. Beasley, Des Moines, Iowa, assignor, by mesne assignments, to Wood Bros., Inc., Dearborn, Mich., a corporation of Delaware Application August 30, 1951, Serial No. 244,398

5 Claims. (Cl. 222—301)

The present invention relates to a seed case for a planting mechanism and more particularly to a seed case formed of a plurality of cooperating sheet material members secured together without the necessity of welding, brazing or the like.

In grain drills utilized for the sowing of a relatively small grain or grass seed, the conventional seeding mechanism includes a seed case disposed beneath a seed hopper to receive seed therefrom by gravity feed. The conventional seed case generally takes the form of a casting within which a seed wheel is positioned for rotary movement to dispose the seed through the case to a depending dispensing chute, and the seed wheel is also laterally movable into and out of the case to vary the amount of seed fed thereby. The seed case casting is relatively intricate inasmuch as the seed wheel and the associated cut off must accurately abut the side surfaces of the case in order to accurately control seed feeding, and further, the seed case must have accurately positioned projections to serve as a feed lip an a cut off flange to control the rate of seed dispensing. Another complication of the casting is the necessity of providing a rosette washer or the like to journal the seed wheel for rotation while accommodating lateral sliding movement thereof, and heretofore this rosette washer has been cast in the case. Due to the intricate nature of the casting and the necessity for accuracy in positioning the various portions thereof, the casting of the seed cases has presented many difficulties and a high rejection rate of production castings has resulted.

The present invention now provides a seed case formed entirely of sheet material parts which are formed to provide the necessary operating portions of the seed case. The utility of sheet material makes possible the stamping of the seed case components to accurate dimensions followed by deformation of the stamped parts to a desired contour for ready assembly, and with the parts being secured in their assembled relation without the necessity of welding or similar techniques during assembly.

More particularly, the stamped seed case of the present invention includes a seed case body provided with a central web and depending side flaps which cooperate with a bottom wrapper positioned between the side flaps to form the seed case body. The seed case body web portion is formed with a downwardly deflected flange providing a seed cut off, while the bottom wrapper terminates in a feed lip for cooperation with the seed wheel to provide seed metering means. A stamped rosette washer is secured to one of the body flaps by means of a retaining element which in turn is secured to one of the body flaps by tangs struck from the body and by additional tangs carried by the case wrapper and extending through the body flanges.

It is, therefore, an important object of the present invention to provide an improved seed case formed completely of sheet material.

Another important object is the provision of a seed case formed of stamped sheet metal components secured together by integrally formed securing elements.

A further object is to provide a sheet metal seed case formed of stamped components including a case body having depending side flaps and a wrapper bottom interposed between the body flaps, the body and wrapper components providing a feed lip and a cut off flange for co-action with a seed wheel for controlling the dispensing of seed from the case.

Still another object is the provision of a seed case for a grain drill composed entirely of stamped sheet metal components including a case body having depending side flanges, a wrapper body interposed between the side flanges and secured thereto by integral tangs struck from the case body and the wrapper, and a seed wheel guide retaining member carried by one of the case body flaps and secured thereto by tangs including tangs struck from the wrapper bottom and extending through the case body flaps.

The specific nature of this invention, as well as other objects and advantages thereof, will become apparent to those skilled in the art from the following detailed description, taken in conjunction with the attached sheets of drawings on which, by way of preferred example only, is illustrated two embodiments of this invention.

On the drawings:

Figure 1 is a fragmentary sectional view of a grain drill illustrating a seed case of the present invention interposed between a seed hopper and a dispensing chute of the drill;

Figure 2 is a sectional view, with parts shown in elevation, taken along the plane 2—2 of Figure 1;

Figure 3 is a sectional view taken along the plane 3—3 of Figure 2;

Figure 4 is a fragmentary sectional view taken along the plane 4—4 of Figure 3;

Figure 5 is a sectional view taken along the plane 5—5 of Figure 3;

Figure 6 is a sectional view taken along the plane 6—6 of Figure 2;

Figure 7 is a sectional view taken along the plane 7—7 of Figure 6;

Figure 8 is a sectional view taken along the plane 8—8 of Figure 2;

Figure 9 is a plan view of a stamped blank from which the seed case body is formed;

Figure 10 is a side elevational view, with parts broken away and in sections, of a modified form of a seed case of the present invention;

Figure 11 is a plan view of a blank from which the seed case body of Figure 10 is formed; and Figure 12 is a sectional view taken along the plane 12—12 of Figure 10.

As shown on the drawings:

In Figure 1, reference numeral 10 refers to a grain drill having an upper seed hopper 11 adapted to contain small grain seed, grass seed or the like for gravity flow downwardly through a seed case of the present invention indicated generally at 12. The seed case 12 serves to meter the seed downwardly to a dispensing chute 13 through which the seed falls by gravity to the ground. The dispensing chute 13 is also adapted to receive fertilizer or the like from a second superimposed hopper 14 and from a laterally extending seed chute 15 adapted to be connected to a hopper or the like for containing a second type of seed.

As best illustrated in Figures 2 and 3, the seed case 12 comprises a case body 16 formed of sheet metal or similar sheet material. The one piece case body is initially stamped as a blank illustrated in Figure 9, the blank having a central web portion 17 and end flap portions 18 lying on either side of the web portions 17. The web portion 17 is provided with apertures 19 adjacent each lateral edge thereof and a larger central aperture 20. One edge of the aperture 20 is defined by a cut off flap 21, while the opposing edge of the aperture 20 is provided with deflectable tangs 22 on either side of the edge 22a. One of the end flaps 18 is provided with a large circular aperture 23, with a pair of upper deflectable tangs 24 lying on opposed sides of the aperture 23, and with lower generally rectangular tang slots 25. The other of the flaps 18 is also provided with a central circular aperture 26, with generally radially extending slots 27 communicating with the aperture 26, and with outer tang slots 28 corresponding in position to the slots 25 of the other flap 18. The free forward corner portions of the flaps 18 are provided with identical tangs 29 for a purpose to be hereinafter more fully described.

During the assembly of the seed case, the flaps 18 are deflected downwardly to define the sides of the seed case, and the flap 21 is deflected downwardly between the side flaps 18 to project generally toward the circular apertures 23 and 26. A wrapper bottom 30 is then interposed between the flaps 18 with one terminal edge of the wrapper bottom abutting the edge 22a to be secured thereto by entry beneath the tangs 22, so that the bottom depends from the web 17 with the arcuate lower portion 31 of the wrapper bottom substantially concentric with an underlying the apertures 23 and 26. In Figure 5, it will be seen that the wrapper bottom 30 is provided with laterally outwardly extending tangs 32 which project through the slots 25 and 28 formed in the flaps 18 of the body 16 and these tangs are deformed, as by staking, to prevent lateral separation of the flaps 18 and to retain the wrapper bottom therebetween. The aperture 23 of the flap portion 18 is encircled by a generally circular retainer 33 having its outer peripheral portions entered beneath the tangs 24 of the flap 18 (Figure 4), and having a central outwardly dished inner peripheral flange 34 overlying the outer peripheral portions of a rosette washer 35 which is positioned to overlie the aperture 23. The washer 35 and the retainer 33 are further retained in position by the tangs 32 of the bottom wrapper which extend through slots 36 formed in the retainer for registry with the slots 25 of the adjacent flap 18.

The rosette washer 35 is adapted to receive therethrough a fluted seed wheel 37 with the peripheral flutes of the wheel mating with and snugly engaging the inner periphery of the rosette washer, the washer thus serving to guide the seed wheel for axial movement while at the same time meshing with the wheel to prevent axial discharge of material being fed by the wheel. The seed wheel 37 is disposed upon a shaft 38 of square cross section with the wheel being axially positioned upon the shaft by means of a set screw 39 threadably retained by the wheel to extend radially therethrough into engagement with the shaft.

One axial face of the seed wheel 37 is recessed, as at 40, to receive a corresponding projection 41 formed on a generally cylindrical collar 42 axially aligned with the seed wheel 37 and positioned on the shaft 38 in juxtaposition to the seed wheel by means of a set screw 43. The collar 42 is provided with a terminal shoulder 44 which abuts one axial end of a cut off element 45. The cut off element 45 is semicylindrical in contour (Figure 8) with its inner periphery snugly abutting the outer periphery of the collar 42. The cut off element 45 terminates in radially outturned projections 46 which are received by the slots 27 formed in the other flap 18 adjacent the flap aperture 26. The axial dimension of the cut off element 45 is such that it snugly fits between the collar flange 44 and the adjacent end face of the seed wheel 37 and it will be appreciated that axial movement of the shaft 38, causing corresponding axial movement of the seed wheel 37 and the collar 42, will also cause axial movement of the cut off element 45.

Thus, it will be seen that the present invention provides an improved seed case formed completely of stamped sheet metal parts and which requires no external fastening means, such as welding, brazing or the like. The flaps 18 of the case body 17 are retained against the wrapper bottom 30 by means of the tangs 32 of the wrapper bottom, and these tangs co-act with the tangs 24 struck from the case flanges 18 to secure the retainer 33 to the seed case while accommodating rotation of the rosette washer 35 with the seed wheel 37.

The seed dispensing through the seed case upon rotation of the seed wheel is controlled by an upwardly projecting terminal feed lip 47 at the free terminal end of the wrapper bottom 31, while the depending cut off flange 21 of the case body web 17 prevents a carry over of seed by the seed wheel beyond the dispensing hopper defined by the lip 47 and the flange 21. The utilization of a separate feed element 45 with a co-movable collar 42 accommodates the forming of the element 45 as a stamping with the projections 46 of the element 45 preventing rotation of this member despite rotation of the collar 42 with the seed wheel 37.

The mounting of the seed case 12 within the grain drill 10 is best illustrated in Figure 1, and this mounting includes fastening means, such as nuts and bolts 48 extending through the apertures 19 of the feed case web portion 17 and registering apertures formed in the bottom of the seed hopper 11. To further position the seed case within the drill 10, the case side flaps 18 are provided with the outwardly directed tangs 29 which are received by corresponding apertures formed in the dispensing chute 13.

In the modified form of the invention shown in Figures 10 and 11, the construction of the seed case is substantially identical to that hereinbefore described with identical reference numerals indicating identical portions of the structure. This modified type of seed case is utilized for the feeding of seed directly to a flexible hose or the like, rather than to a hopper as in the seed case hereinbefore described. Initially, it will be noted that the seed case body blank 50 has been modified so as to provide an integral dispensing snout 51 provided by mating sheet metal projections 52 formed at the forward edge of the blank, the snout projections each being adapted to be deformed to a generally semicircular configuration during assembly with the edges 53 and 54 of the snout portions of the blanks abutting as best shown in Figure 12. The tangs formed integrally with the wrapper bottom 30 serve not only to retain the wrapper and seed case flaps in position, but also to retain the edges 53 and 54 in abutment. Also, it will be noted that the wrapper bottom has been slightly changed so that a depending terminal projection 55 is provided at the feed lip 47 so as to more accurately guide seed from the seed wheel into the snout 51 and the wrapper bottom tangs 32 project laterally outwardly from this projection 55.

The snout blanks are each apertured, as at 56, to receive a pin 57 therethrough to retain a flexible hose or the like 58 thereon.

The operation of the seed case of Figures 10 and 11 is substantially the same as that hereinbefore described and the advantages heretofore set forth also reside in the modified structure. The modified structure is particularly adapted for use as a grass seeding attachment and the provision of an integral snout is particularly advantageous for this use since it eliminates a separate snout as heretofore necessary. Further, the improved seed guiding plate 55 is particularly adapted to guide seed into this snout.

The advantages of the present invention over the former cast seed case will be appreciated by those skilled in the art. The exclusive use of stampings in the case proper substantially reduces cost while at the same time presenting plane inner case surfaces, so that accurate seed cut-off is insured. The utilization of mutually supporting seed case body and wrapper bottom members aids in strengthening the case, while the provision of interlocking tabs to secure the case components in firm assembly simplifies the assembly and disassembly of the case. The mounting of the seed wheel and cut-off on a square shaft and the utility of positioning set screws further simplifies the adjustment and assembly of the feeding mechanism, and the use of a stamped cut-off element 45 partially encircling the collar 42 eliminates a formerly necessary and relatively intricate casting. In conclusion, the instant invention provides a simplified and economical seed case having the functional and structural advantages hereinbefore set forth.

It will, of course, be understood that various details of construction may be varied through a wide range without departing from the principles of this invention and it is, therefore, not the purpose to limit the patent granted hereon otherwise than necessitated by the scope of the appended claims.

I claim:

1. A stamped sheet metal seed case for a grain drill comprising a one-piece body having a central web portion and depending generally parallel side flaps, said web portion having a central inlet aperture and downwardly deflected tangs adjacent one side of said aperture and an integrally formed depending cut-off lip defining an opposing side of the aperture, and a separately formed bottom wrapper interposed between said flaps and having one terminal edge underlying said tangs to secure said wrapper to said web portion, the other terminal edge of said wrapper defining a feed lip generally underlying said cut-off lip, said wrapper also having outwardly directed integrally formed tangs projecting through said side flaps for deformation to retain said flaps in parallel relation with said wrapper in position therebetween.

2. A seed case comprising a one-piece sheet metal body having integrally formed depending side flaps each provided with a tang slot, a generally arcuate wrapper interposed between said side flaps and having deflectable tangs projecting therebeyond for entry into said slots, a rotatable guide element in juxtaposition to one of said flaps, and a retainer element encircling said guide element and having a portion abutting said one of said side flaps exteriorly of said guide element, said retainer element portion having a slot registering with that of said one of said flaps for receiving one of said tangs therethrough, said tangs when deflected securing said body, said wrapper, said guide element and said retainer element in assembly.

3. A seed case comprising a body formed of sheet material having a web portion and integrally formed depending side flaps each provided with a central aperture and tang slots adjacent the periphery of said aperture, one of said flaps also having deflectable tangs struck therefrom adjacent the aperture thereof, a bottom wrapper interposed between said flaps and having an arcuate portion provided with laterally projecting tangs extending through said flap slots, a rosette washer overlying the aperture of said one of said flaps, and a washer retainer encircling said washer and having peripheral portions thereof interposed between said one flap and said tangs therefrom, said retainer having tang slots registering with those of said one flap to receive said wrapper tangs therethrough.

4. A seed case for a grain drill adapted to encase a feed wheel and cut-off mechanism comprising a one-piece case body having a web portion joining dependent side flaps, each of said side flaps being apertured to receive said mechanism therethrough and having tang slots offset from said apertures, one of said side flaps also having tangs struck therefrom to project laterally therebeyond, a rosette washer rotatably positioned alongside said one side flap, a washer retainer plate overlying peripheral portions of said washer and contacting said one flap with portions of said plate being entered beneath said flap tangs, said plate also having tang slots registering with those of said one side flap, and a wrapper member interposed between said flaps and having laterally projecting tangs extending through the tang slots of said flaps and said plate to secure the elements of said case in firm assembly.

5. In a seeding mechanism for a grain drill including an axially movable fluted seed wheel and a cooperating cut-off element, the improvements which comprise a sheet metal case body having a web portion and a pair of dependent side flaps apertured for slidably receiving said seed wheel and said cut-off element respectively, said web portion having a dependent cut-off lip for extending into closely spaced relation to said wheel and said element, a separately formed wrapper bottom interposed between said flaps for underlying said wheel and said element and terminating in an upturned feed lip for cooperation with said wheel to meter seed through said seeding mechanism, a rosette washer flush with an outer surface of one of said flaps and rotatable thereagainst for journaling said seed wheel, and a separately formed outwardly dished washer retainer having a peripheral flange contacting said outer surface of said one flap to surround said washer while accommodating rotation thereof, said case body and said wrapper bottom being provided with integrally formed tangs for securing the same in assembled relation and for securing said retainer to said one flap.

References Cited in the file of this patent

UNITED STATES PATENTS

| | | |
|---|---|---|
| 176,719 | Wescott | Apr. 25, 1876 |
| 811,203 | Davis | Jan. 30, 1906 |
| 1,291,151 | Robinson | Jan. 14, 1919 |
| 1,707,572 | Roller | Apr. 2, 1929 |
| 2,442,420 | Lindvall et al. | June 1, 1948 |
| 2,599,452 | Higginson | June 3, 1952 |